United States Patent Office 2,722,540
Patented Nov. 1, 1955

2,722,540

MAKING HCN TETRAMER

Don E. Carter, Dayton, Ohio, assignor to Monsanto Chemical Company, St. Louis, Mo., a corporation of Delaware No Drawing. Application October 27, 1953,
Serial No. 388,670

13 Claims. (Cl. 260—465.5)

This invention relates to the polymerization of hydrogen cyanide. In one aspect the invention pertains to the formation of the tetramer of hydrogen cyanide by polymerization of anhydrous liquid hydrogen cyanide. In another aspect the invention provides a new class of catalysts for the polymerization of hydrogen cyanide to form HCN tetramer.

Hydrogen cyanide tetramer, also referred to herein as HCN tetramer or as tetramer, is a known chemical compound, having the empirical formula $(HCN)_4$ and the probable structural formula:

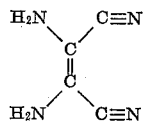

This material can be called diaminomaleinitrile, although there is evidence that it often reacts as the imino-modification. The tetramer can be reacted with glyoxal to form 2,3-dicyanopyrazine.

It has been pointed out in the literature that the polymerization of hydrogen cyanide can take various courses. The particular course followed is greatly dependent upon the reaction conditions and environment. The classical catalyst employed for preparing the tetramer is potassium cyanide (KCN). An important objection is the low proportion of tetramer in the total polymer formed. Certain types of basic solid catalysts insoluble in liquid hydrogen cyanide are alleged to favor the formation of tetramer. Further, the polymerization of hydrogen cyanide in the presence of water has been disclosed using ammonia and amines as catalysts. However, tetramer is not formed when water is present.

An object of this invention is to effect the formation of HCN tetramer by the polymerization of hydrogen cyanide. Another object is to provide a new class of catalysts for the polymerization of hydrogen cyanide to its tetramer. A further object of the invention is to provide catalysts for such reaction which are soluble in liquid anhydrous HCN. Yet another object of the invention is to provide catalysts for said reaction that permit use of an added organic solvent during the polymerization. A further object is to provide a catalyst for the polymerization of hydrogen cyanide, that results in the formation of a higher proportion of tetramer in total polymer than obtained with other catalysts such as potassium cyanide. Another object is to provide a continuous hydrogen cyanide polymerization and HCN tetramer recovery process. Further objects and advantages of the invention will be apparent to one skilled in the art from the accompanying disclosure and discussion.

The essence of the present invention lies in the use of quaternary ammonium hydroxides as catalysts for the polymerization of hydrogen cyanide to form hydrogen cyanide tetramer. In a preferred embodiment of the invention an aryl trialkyl ammonium hydroxide is employed as catalyst. In its broader aspects the invention encompasses the use of any basic quaternary ammonium hydroxide as catalyst for the polymerization of liquid anhydrous hydrogen cyanide.

The quaternary ammonium hydroxides are strong organic bases having characteristics setting them apart from other organic bases such as amines, and can be generally described by the formula:

wherein each R is an organic radical and the various R's can be the same or different. In the preferred group of catalysts of the present invention, one of the R's is an aryl compound, preferably containing a single benzene ring, and the other three R's are alkyl, preferably all three being methyl. Among the aryl trialkyl ammonium hydroxides, benzyltrimethyl and phenyltrimethyl are preferred, although there is no particular limitation on the aryl or alkyl radicals. However, in general, such quaternary ammonium hydroxides are not formed from aryl radicals in which both ortho- positions are substituted or from alkyl radicals which are too complex. Suitable quaternary ammonium hydroxides include those wherein one or more of the organic radicals are aliphatic, aromatic, alicyclic, aralkyl, or alkaryl, and wherein they are attached to the nitrogen atom at primary, secondary or tertiary carbon atoms. While quaternary ammonium hydroxides in which all organic radicals are hydrocarbon are most common, those containing non-hydrocarbon groups are permissible so long as such groups do not interfere with the desired hydrogen cyanide polymerization.

By way of example and not limitation, the following quaternary ammonium hydroxides are mentioned as suitable: tetramethyl ammonium hydroxide, benzyltrimethyl ammonium hydroxide, phenyltrimethyl ammonium hydroxide, phenyltriethyl ammonium hydroxide, choline (β-hydroxyethyltrimethyl ammonium hydroxide), dimethylethyl-β-chloroethyl ammonium hydroxide, trimethylisobutyl ammonium hydroxide, trimethyl-p-n-propylphenyl ammonium hydroxide, benzylcyclohexyldiethyl ammonium hydroxide.

The quaternary ammonium hydroxide chosen as catalyst in any particular instance is employed in small but catalytic amounts. It is seldom if ever necessary or advantageous to use more than 5 weight per cent based on the hydrogen cyanide, and often as little as 0.1 weight per cent is sufficient.

The reaction temperature and reaction time are interrelated, as in general the higher the reaction temperature the shorter the time required to obtain a given conversion of hydrogen cyanide to polymer. However, a temperature within the range of 0° C. to 50° C. is preferred, as higher temperatures have an adverse effect on the production of tetramer. A temperature should not be used that is so high as to diminish or prevent entirely the formation of tetramer. A preferred temperature range is 15° C. to 30° C. At the comparatively low temperatures suitable for the process, reaction times are fairly extended. It is preferred not to attempt too high a total conversion of hydrogen cyanide but rather to permit only part of the hydrogen cyanide to be polymerized in a batch polymerization.

An advantage of the present invention lies in the solubility of the catalysts in the liquid anhydrous hydrogen cyanide, permitting maximum benefit of the catalytic action. The quaternary ammonium hydroxides are readily soluble in anhydrous HCN, whereas catalysts such as NaOH, KCN, and the like dissolve only very slowly and to a very small extent. My soluble catalysts also permit the employment of an added non-reacting organic solvent. Polymerization of hydrogen cyanide ordinarily results in deposition of solid polymer on the walls of the reactor. By using the soluble catalysts of the present invention, and especially with an added solvent, and by maintaining continuous stirring or other agitation of the reaction mixture, I obtain the polymer in the form of a slurry from which polymer is readily separated. In accordance with a preferred embodiment of the invention, I cause the polymerization to go forward until some solid polymer has separated from the reaction mixture and formed a slurry in the liquid, and I then continuously remove solid polymer from the slurry and thus maintain the solids content of the slurry at a low value, preferably less than 1 weight per cent solids in the total slurry. Use of the soluble catalyst and an added solvent also permits ready removal of the exothermic heat of reaction by vaporization of solvent from reaction mixture or by facilitating contact of reaction mixture with cooling coils or jacket.

As non-reactive solvent in the reaction mixture, I prefer to use one that is relatively non-selective for tetramer over higher molecular weight polymer. While in general tetramer is more soluble in organic solvents than other components of the polymer, most solvents do not have a higher degree of selectivity for tetramer. Among suitable solvents of this nature can be mentioned benzene, carbon tetrachloride, methylene chloride, petroleum ether, and in general chlorinated hydrocarbons, aromatic hydrocarbons, aliphatic hydrocarbons.

In the preferred operation wherein an organic solvent relatively non-selective for tetramer over higher molecular weight polymer is used in the reaction mixture and wherein solids are continuously separated, as by filtration, centrifuging or decantation, from the reaction mixture thereby maintaining a low solids content in the reaction mixture, I also prefer to subject the thus-separated polymer to treatment for recovery of tetramer by extracting same with a different organic solvent of relatively high selectivity for tetramer over higher molecular weight polymer. In other words, I employ one solvent in the reaction mixture and a different organic solvent to extract tetramer from separated polymer, the first solvent being relatively less selective for tetramer than is the second solvent. As examples of organic solvents for extracting tetramer from polymer can be mentioned acetonitrile, propionitrile, butyronitrile, and diethyl ether. Alkyl nitriles are by far the preferred solvents for extracting tetramer from total polymer, inasmuch as they not only have a high solvent capacity for tetramer, but they are highly selective for tetramer over other components of the total polymer.

The polymerization reaction can be effected at any pressure at which, for the given reaction temperature, anhydrous hydrogen cyanide is liquid. Thus, at temperatures below the normal boiling point of liquid anhydrous HCN (25° C.), atmospheric pressure is satisfactory. In a closed reaction system the autogenous pressure of the reaction mixture is satisfactory, and where a temperature above the normal boiling point of the reaction mixture is used, a closed system is naturally used and the pressure is higher than atmospheric.

The hydrogen cyanide employed should be of comparatively high purity. The hydrogen cyanide should be free from water. Furthermore, acids and other material that may be present in commercial hydrogen cyanide should be kept to a minimum or avoided entirely. Freshly distilled hydrogen cyanide is the most suitable starting material.

The following examples illustrate suitable conditions and materials for the practice of the invention and illustrate some of the benefits thereof. It will be understood of course that the invention in its broadest scope is not limited by the specific details of these particular examples.

*Example 1*

To 35 grams purified HCN in a 100 ml. flask was added 0.36 gram of a 29 per cent solution of tetramethyl ammonium hydroxide in ethanol solution. A homogeneous solution resulted. The flask was placed in a water bath thermostated at 16° C. to 18° C. and was vented through $CaSO_4$ to the atmosphere. After 40 hours the contents of the flask were dark brown in color, indicating that reaction had occurred. HCN tetramer was detected in the liquid by spectrophotometry. After 140 hours the liquid remaining in the flask was evaporated into a stream of nitrogen, leaving 5.7 grams of solid. Duplicate assays by spectrophotometry indicated 11.9 per cent and 14.0 per cent tetramer in the polymer.

*Example 2*

Procedure and equipment were identical with that of Example 1. To 35 grams purified HCN was added 0.40 gram of a 35 per cent solution of benzyltrimethyl ammonium hydroxide in methanol. After 40 hours the contents of the flask were dark brown in color, indicating that reaction had occurred. HCN tetramer was detected in the liquid by spectrophotometry. After 140 hours the liquid remaining in the flask was evaporated into a stream of nitrogen, leaving 9.8 grams of solid. Duplicate assays by spectrophotometry indicated 25.6 per cent and 19.5 per cent HCN tetramer in the polymer.

*Example 3*

To 420 grams purified HCN in a 2-inch diameter x 18 inch stainless steel tube were added 1.8 grams KCN. The tube was placed in a water bath maintained at 16° C. to 20° C. and was vented to the atmosphere through $CaSO_4$. After 144 hours the liquid remaining in the tube was decanted and the HCN remaining on the polymer allowed to evaporate into the air. Thirty-one grams of dark colored polymer was recovered from the tube. The assay of this polymer by spectrophotometry was 6 per cent HCN tetramer.

Calculated to the basis of 35 grams HCN, in order to give a direct comparison with Examples 1 and 2, the catalyst used was 0.15 gram and the total polymer was 2.6 grams. It will be noted that in calculating the amount of catalyst used in Examples 1 and 2 to correct for the catalyst solvent, Example 1 used 0.11 gram catalyst and Example 2 used 0.14 gram catalyst.

While the invention has been described with particular reference to various preferred embodiments thereof, it will be appreciated that numerous modifications and variations are possible without departing from the invention.

I claim:

1. In the polymerization of hydrogen cyanide to form HCN tetramer, the improvement which comprises employing a quaternary ammonium hydroxide as catalyst.

2. In the polymerization of hydrogen cyanide to form HCN tetramer, the improvement which comprises employing an aryl trialkyl ammonium hydroxide as catalyst.

3. In the polymerization of hydrogen cyanide to form HCN tetramer, the improvement which comprises employing an aryl trimethyl ammonium hydroxide as catalyst.

4. In the polymerization of hydrogen cyanide to form HCN tetramer, the improvement which comprises employing benzyl trimethyl ammonium hydroxide as catalyst.

5. In the polymerization of hydrogen cyanide to form HCN tetramer, the improvement which comprises employing tetramethyl ammonium hydroxide as catalyst.

6. A process which comprises polymerizing liquid anhydrous hydrogen cyanide containing a small but catalytic amount of a quaternary ammonium hydroxide at a temperature and for a time effective to produce HCN tetramer, and recovering HCN tetramer as a product of the process.

7. A process according to claim 6 wherein said quaternary ammonium hydroxide is an aryl trimethyl ammonium hydroxide.

8. A process which comprises polymerizing liquid anhydrous hydrogen cyanide containing a small but catalytic amount of a quaternary ammonium hydroxide at a temperature within the range of 0° C. to 50° C., and recovering HCN tetramer from resulting polymer.

9. A process according to claim 8 wherein said quaternary ammonium hydroxide is present in an amount within the range of 0.1 to 5 weight per cent of said hydrogen cyanide.

10. A process which comprises subjecting a solution of liquid anhydrous hydrogen cyanide in a non-reacting organic solvent and containing a catalytic amount not to exceed 5 weight per cent, based on said hydrogen cyanide, of a quaternary ammonium hydroxide, to a temperature within the range of 0° C. to 50° C. effecting formation of a slurry of solid polymer in hydrogen cyanide, continuously separating solid polymer from said slurry to maintain a low solids content in said slurry, and recovering HCN tetramer from said separated solid polymer.

11. A process according to claim 10 wherein said solvent is relatively non-selective for tetramer over higher molecular weight polymer, and wherein said recovering of HCN tetramer from said separated solid polymer is effected by selectively extracting tetramer from polymer with an organic solvent relatively more selective for tetramer over higher molecular weight polymer than said first-named solvent.

12. A process according to claim 10 wherein said quaternary ammonium hydroxide is benzyl trimethyl ammonium hydroxide.

13. A process according to claim 10 wherein said quaternary ammonium hydroxide is tetramethyl ammonium hydroxide.

References Cited in the file of this patent

UNITED STATES PATENTS 2,499,441  Woodward _____ Mar. 7, 1950